(12) United States Patent
Xu et al.

(10) Patent No.: US 9,399,191 B2
(45) Date of Patent: Jul. 26, 2016

(54) WET LIMESTONE FLUE GAS DESULFURIZATION SLURRY STABILIZER AND METHOD FOR USING THE SAME

(75) Inventors: Rui Xu, Nanchang (CN); Chongmin Mei, Nanchang (CN); Fayuan Wu, Nanchang (CN); Yongqiang Deng, Nanchang (CN); Rongjun Mao, Nanchang (CN); Xu Tian, Nanchang (CN)

(73) Assignees: STATE GRID CORPORATION OF CHINA, Beijing (CN); STATE GRID JIANGXI ELECTRIC POWER RESEARCH INSTITUTE, Nanchang, Jiangxi Province (CN)

( * ) Notice: Subject to any disclaimer, the term of this patent is extended or adjusted under 35 U.S.C. 154(b) by 0 days.

(21) Appl. No.: 14/363,295

(22) PCT Filed: May 2, 2012

(86) PCT No.: PCT/CN2012/000580
§ 371 (c)(1),
(2), (4) Date: Jun. 5, 2014

(87) PCT Pub. No.: WO2013/082856
PCT Pub. Date: Jun. 13, 2013

(65) Prior Publication Data
US 2014/0346398 A1 Nov. 27, 2014

(30) Foreign Application Priority Data
Dec. 6, 2011 (CN) .......................... 2011 1 0400817

(51) Int. Cl.
*B01D 53/50* (2006.01)

(52) U.S. Cl.
CPC ........ *B01D 53/502* (2013.01); *B01D 2251/404* (2013.01); *B01D 2251/606* (2013.01)

(58) Field of Classification Search
CPC .................................................... B01D 53/502
See application file for complete search history.

(56) References Cited

FOREIGN PATENT DOCUMENTS

| CN | 102019138 A | 4/2011 |
| CN | 102091510 A | 6/2011 |
| CN | 102101011 A | 6/2011 |

OTHER PUBLICATIONS

International Search Report (Form PCT/ISA/210) for PCT/CN2011/000580, mailed Sep. 13, 2012.
Wang, Niaguang et al., "Experimental Investigation on Intensifying Effect of Organic Alkali on Wet Flue Gas Desulfurization with Limestone", Proceedings of the CSEE, Jun. 15, 2008, vol. 28, No. 17, pp. 61-64, ISSN 0258-8013.

*Primary Examiner* — Peter F Godenschwager
(74) *Attorney, Agent, or Firm* — Koppel, Patrick, Heybl & Philpott

(57) ABSTRACT

A wet limestone flue gas desulfurization slurry stabilizer and a method for using the same are disclosed. The stabilizer consists of lime, sodium formate and an antifoaming agent, the components and mass percentages thereof are as follows: lime, 30% to 70%, sodium formate, 15% to 40%, the antifoaming agent, 15% to 40%. The method for using the desulfurization slurry stabilizer comprises: preparing the slurry stabilizer into a homogeneous liquid having a mass concentration of 10% to 30% with water or desulfurization slurry outside a desulfurization tower, and spraying the homogeneous liquid into the absorption area and the reaction area of the desulfurization tower using a pump and a slurry atomizing and spraying device.

2 Claims, No Drawings

WET LIMESTONE FLUE GAS DESULFURIZATION SLURRY STABILIZER AND METHOD FOR USING THE SAME

TECHNICAL FIELD

The present application relates to a wet limestone flue gas desulfurization slurry stabilizer and a method for using the same, belonging to the field of wet flue gas desulfurization technologies.

BACKGROUND

The $SO_2$ emitted from coal-fired power plants is the main source of atmospheric pollutants and the primary cause of acid rain. With advantages of technical maturity, high desulfurization rate, reliable operation and comprehensively utilizable side products, wet limestone-gypsum flue gas desulfurization technology has been the most widely used flue gas desulfurization technology in the world.

Due to market changes, the fire coals actually used in thermal power plants which can be obtained from a wide diverse sources containing a variety of impurities, the sulphur content of the actually used fire coals is significantly different from the designed one, and the characteristics and the $SO_2$ content of flue gas fluctuate widely, leading to the overloaded operation of a desulfurization system, the likely foaming of slurry, the decrease of the pH value of slurry and the reduction of desulfurization rate, which severely influences the up-to-standard emission of $SO_2$ in flue gas.

To control the emission of nitric oxides in flue gas of thermal power plants, some of thermal power plants are equipped with a flue gas denitration system, and the common flue gas denitration technology is a selective catalytic reduction (SCR) technology according to which a great amount of metal oxide catalyst is needed to oxidize the $SO_2$ in flue gas into $SO_3$ which forms tiny sulfuric acid mist that cannot be removed by using a wet limestone-gypsum flue desulfurization technology, which causes the corrosion of a downstream device and the emission of acid mist.

SUMMARY

The present application aims to provide a desulfurization slurry stabilizer used in wet limestone flue gas desulfurization technology to stabilize the pH value of desulfurization slurry, inhibit the generation of desulfurization slurry foam, reduce the emission of sulfuric acid mist and improve desulfurization efficiency. The present application also provides a method for using the desulfurization slurry stabilizer.

According to a technical solution provided herein, a wet limestone flue gas desulfurization slurry stabilizer consists of lime, sodium formate, and an antifoaming agent, the components and mass percentages thereof are as follows: the mass percentage of lime is 30% to 70%; the mass percentage of sodium formate is 15% to 40%; the mass percentage of the antifoaming agent is 15% to 40%.

The lime is quicklime or slaked lime.

The antifoaming agent is an silicone-polyether solid complex, and the silicone-polyether solid complex prepared by mixing 30% of polydimethyl siloxane fluid, 10% of polyether, 30% of sodium carbonate and 30% of sodium silicate and drying and crushing the mixture.

The method for using the wet limestone flue gas desulfurization slurry stabilizer includes: preparing the slurry stabilizer into a homogeneous liquid having a mass concentration of 10% to 30% with water or desulfurization slurry outside a desulfurization tower, and pumping the homogeneous liquid into the inlet of a slurry circulating pump and feeding the homogeneous liquid into an absorption area and a reaction area in sequence by using the slurry circulating pump and a slurry atomizing and spraying device so that the homogeneous liquid physically and chemically reacts with flue gas and desulfurization slurry, wherein the effective concentration range of the desulfurization slurry stabilizer is 200-1000 mg/L. The specific components of the desulfurization slurry stabilizer are selected according to the state of a desulfurization unit, and the optimal use concentration is determined according to test results.

The use of the wet limestone flue gas desulfurization slurry stabilizer can stabilize the pH value of desulfurization slurry, inhibit the generation of desulfurization slurry foam, reduce the emission of sulfuric acid mist and improves desulfurization efficiency. The functional mechanism of the wet limestone flue gas desulfurization slurry stabilizer is as follows:

(1) The pH value of limestone desulfurization slurry is generally reduced by the significant increase of $SO_2$ in flue gas and the addition of an organic acid desulfurization synergist, and the $Ca(OH)_2$ contained in the desulfurization slurry stabilizer of the present application can neutralize excessive $H^+$ to stabilize the pH value of desulfurization slurry.

(2) The silicone-polyether solid complex compounded by high hydrophilic polyether capable of inhibiting foam for a long time and high hydrophobic organic silicon capable of breaking foam quickly is capable of preventing the generation of desulfurization slurry foam.

(3) A downstream device is corroded and acid mist is emitted as wet limestone-gypsum desulfurization technology is barely capable of removing tiny sulfuric acid mist. The $Ca(OH)_2$ in the desulfurization slurry stabilizer which enters into the solid-liquid-gas three-phase reaction absorption area of an absorption tower after passing the slurry circulating pump and a slurry atomizing and spraying device reacts with sulfuric acid mist, thus reducing the emission of sulfuric acid mist.

(4) In the wet limestone-gypsum desulfurization technology, the main control step influencing the speed of the desulfurization reaction is the mass transfer process at a gas-liquid two-phase interface, the sodium formate in the desulfurization slurry stabilizer is capable of improving the mass transfer process of a desulfurization mechanical reaction, improving reaction activity, reducing the amount of the limestone used and improving desulfurization efficiency.

The present application is applicable to the flue gas desulfurization of coal-fired power plants.

DETAILED DESCRIPTION

Embodiment 1

According to this embodiment, a desulfurization slurry stabilizer consists of slaked lime, sodium formate and an antifoaming agent, the components and mass percentages thereof are as follows: the mass percentage of slaked lime is 55%, the mass percentage of sodium formate is 23% and the mass percentage of the antifoaming agent is 22%.

The desulfurization slurry stabilizer composed of the aforementioned components in the aforementioned ratio is added into the 660 MW wet limestone desulfurization unit of a coal-fired power plant equipped with an SCR system in an amount of 700 mg/L, before the addition of desulfurization slurry stabilizer, the desulfurization rate is 91.5%-92.3%, the content of $SO_3$ in the emitted flue gas is 49.4 mg/m$^3$, in the same running conditions, after the addition of desulfurization slurry stabilizer, the desulfurization rate is 94.2%~95.7%, the content of $SO_3$ in the emitted flue gas is 11.2 mg/m$^3$, and the slurry is not foamed.

Embodiment 2

According to this embodiment, a desulfurization slurry stabilizer consists of slaked lime, sodium, formate and an antifoaming agent, the components and mass percentages thereof are as follows: the mass percentage of slaked lime is 52%, the mass percentage of sodium formate is 30% and the mass percentage of the antifoaming agent is 17%.

Due to the high sulfur content of fire coal and the limited designed volume of a desulfurization tower, a dicarboxylic acid desulfurization synergist of which the main component is adipic acid is generally used in the wet limestone desulfurization unit of a coal-fired power plant to improve desulfurization rate, however, the use of the desulfurization synergist the main component of which is an organic acid makes the pH value of desulfurization slurry decrease from 5.4 to about 5.1, moreover, the pH value is usually unstable when the content of $SO_2$ in flue gas fluctuates, which undermines the normal running of a desulfurization system. The desulfurization slurry stabilizer composed of the aforementioned components in the aforementioned ratio is added in an amount of 900 mg/L, before the addition of desulfurization slurry stabilizer, the desulfurization rate is 88.1%~91.5%, the pH value of desulfurization slurry is 5.0~5.2, after the addition of desulfurization slurry stabilizer, the desulfurization rate is 90.3%~93.5%, the pH value of desulfurization slurry is 5.3~5.4, and the adaptability to the fluctuation of the $SO_2$ in flue gas is apparently improved.

Embodiment 3

According to this embodiment, a desulfurization slurry stabilizer consists of slaked lime, sodium formate and an antifoaming agent, the components and mass percentages thereof are as follows: the mass percentage of slaked lime is 50%, the mass percentage of sodium formate is 30% and the mass percentage of the antifoaming agent is 20%.

The desulfurization slurry stabilizer composed of the aforementioned components in the aforementioned ratio is added into the 350 MW wet limestone desulfurization unit of a coal-fired power plant equipped with no denitration system in an amount of 700 mg/L, before the addition of desulfurization slurry stabilizer, the desulfurization rate is 88.9%~91%, and the content of $SO_3$ in the emitted flue gas is 36.8 mg/m$^3$, in the same running conditions, after the addition of desulfurization slurry stabilizer, the desulfurization rate is 93.9%~95.1%, and the content of $SO_3$ in the emitted flue gas is 9.9 mg/m$^3$.

Embodiment 4

According to this embodiment, a desulfurization slurry stabilizer consists of quicklime, sodium formate and an antifoaming agent, the components and mass percentages thereof are as follows: the mass percentage of quicklime is 40%, the mass percentage of sodium formate is 30% and the mass percentage of the antifoaming agent is 30%.

The desulfurization slurry stabilizer composed of the aforementioned components in the aforementioned ratio is added into the high sulfur coal-fired 300 MW wet limestone desulfurization unit of a coal-fired power plan in an amount of 1,000 mg/L, before the addition of desulfurization slurry stabilizer, the desulfurization rate is 84%~92%, and the content of $SO_3$ in the emitted flue gas is 64.3 mg/m$^3$, in the same running conditions, after the addition of desulfurization slurry stabilizer, the desulfurization rate is 91.9%~93.4%, and the content of $SO_3$ in the emitted flue gas is 22.1 mg/m$^3$.

What is claimed is:

1. A wet limestone flue gas desulfurization slurry stabilizer consisting of lime, sodium formate and an antifoaming agent, the components and mass percentages thereof are as follows: the mass percentage of lime is 30% to 70%, the mass percentage of sodium formate is 15% to 40% and the mass percentage of an antifoaming agent is 15% to 40%, wherein the antifoaming agent is an silicone-polyether solid complex prepared by mixing 30% of polydimethyl siloxane fluid, 10% of polyether, 30% of sodium carbonate and 30% of sodium silicate and drying and crushing the mixture.

2. A method for using a wet limestone flue gas desulfurization slurry stabilizer, comprising: preparing the slurry stabilizer into a homogeneous liquid having a mass concentration of 10% to 30% with water or desulfurization slurry outside a desulfurization tower, and pumping the homogeneous liquid into an inlet of a slurry circulating pump and feeding the homogeneous liquid into an absorption area and a reaction area in sequence by using the slurry circulating pump and a slurry atomizing and spraying device so that the homogeneous liquid physically and chemically reacts with flue gas and desulfurization slurry, wherein the effective concentration range of the desulfurization slurry stabilizer is 200-1000 mg/L;

wherein the wet limestone flue gas desulfurization slurry stabilizer consists of:

lime having a mass percentage of 30% to 70%;

sodium formate having a mass percentage of 15% to 40%; and an antifoaming agent having a mass percentage of 15% to 40%;

wherein the antifoaming agent is a silicone-polyether solid complex prepared by mixing 30% of polydimethyl siloxane fluid, 10% of polyether, 30% of sodium carbonate and 30% of sodium silicate.

* * * * *